US010025465B2

(12) United States Patent
O'Donoghue et al.

(10) Patent No.: US 10,025,465 B2
(45) Date of Patent: Jul. 17, 2018

(54) METHOD AND SYSTEM FOR A USER SELECTED ZOOM LEVEL FOR OPTIMAL CONTENT DISPLAY SCREEN RENDERING

(71) Applicant: Rakuten Kobo Inc., Toronto (CA)

(72) Inventors: Anthony O'Donoghue, Toronto (CA); Sneha Patel, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 156 days.

(21) Appl. No.: 14/065,075

(22) Filed: Oct. 28, 2013

(65) Prior Publication Data
US 2015/0121213 A1 Apr. 30, 2015

(51) Int. Cl.
G06F 3/0483 (2013.01)
G06F 3/0488 (2013.01)
G06F 9/451 (2018.01)
G06F 9/44 (2018.01)

(52) U.S. Cl.
CPC .......... G06F 3/0483 (2013.01); G06F 3/0488 (2013.01); G06F 9/4446 (2013.01); G06F 9/453 (2018.02); G06F 2203/04806 (2013.01)

(58) Field of Classification Search
CPC .................................................. G06F 3/0483
USPC .......................................................... 715/776
See application file for complete search history.

(56) References Cited

U.S. PATENT DOCUMENTS

| 8,539,342 | B1* | 9/2013 | Lewis | G06F 17/212 715/243 |
|---|---|---|---|---|
| 8,692,736 | B1* | 4/2014 | Johnston | G06F 15/0291 345/1.2 |
| 2006/0150151 | A1* | 7/2006 | Dubinsky | G06F 9/4446 717/114 |
| 2007/0150829 | A1* | 6/2007 | Eschbach | G06F 17/211 715/781 |
| 2010/0223571 | A1* | 9/2010 | Krete | G06F 3/033 715/776 |
| 2010/0306696 | A1* | 12/2010 | Groth | G06F 3/0481 715/800 |
| 2011/0087955 | A1* | 4/2011 | Ho | G06F 17/211 715/230 |
| 2012/0204092 | A1* | 8/2012 | Stoner | G06F 3/0483 715/234 |
| 2012/0240075 | A1* | 9/2012 | Kim | G06F 3/0481 715/776 |
| 2013/0271498 | A1* | 10/2013 | Poalini | G06F 3/0483 345/660 |
| 2014/0026101 | A1* | 1/2014 | Pallakoff | G06F 3/0482 715/841 |
| 2014/0229838 | A1* | 8/2014 | Xue | G06F 17/30126 715/728 |

(Continued)

Primary Examiner — Mohammed-Ibrahim Zuberi
(74) Attorney, Agent, or Firm — Oblon, McClelland, Maier & Neustadt, L.L.P.

(57) ABSTRACT

A user interface method for user selected zoom level determination. The method includes displaying a page of a document on a screen of the handheld device, and receiving an input from a user of the handheld device and setting a zoom level of the page in accordance there with. The method further includes, in response to the zoom level, processing the page in accordance there with to produce a plurality of dynamically sized segments, and for displaying successive pages on the screen, processing the successive pages to produce additional dynamically sized segments in accordance with the zoom level.

23 Claims, 13 Drawing Sheets

(56) References Cited

U.S. PATENT DOCUMENTS

2015/0095835 A1* 4/2015 Mantha ................ G06F 3/0483
715/776

* cited by examiner since Buster Keaton, has access. "That," he said finally, "is *acting*."

Now he tells the story of his morning on Roosevelt Island—except not about the kickball game. I will have to learn about that later, on the Internet. Instead, he talks about the original reason for the trip, where he went first: to see the recently completed FDR Four Freedoms memorial, located on the tip of the island (where, he mentions, an unfilmed scene in *Ghostbusters* was meant to be set). He had seen a documentary about the project on PBS and, having recently channeled the president, decided to take his sons and their friends for a look.

"It was designed by Louis Kahn, and it's got some moves," he says, flipping through photos on his phone and shaking his head, impressed. "This is what they call The Room," he says, passing the phone. "There's six-by-six-by-twelve-foot granite blocks with a tiny bit of space between them that's polished on the inside, so the light actually kicks through the whole thing. The Room is pretty boss."

The only problem was that the memorial was in the final stages of construction and not yet open, so they crept around the edges, looking for a way in. A perfect setup for a little of that Murray magic.

"I waved to the people driving in and out in their itty-bitty cars, and eventually I saw one of the guys walking back, saying, 'They

Fig. 2 he, since Buster Keaton, has access. "That," he said finally, "is *acting*."

Now he tells the story of his morning on Roosevelt Island—except not about the kickball game. I will have to learn about that later, on the Internet. Instead, he talks about the original reason for the trip, where he went first: to see the recently completed FDR Four Freedoms memorial, located on the tip of the island (where, he mentions, an unfilmed scene in He had
ect on Pl
presiden
friends f "It w
got som
photos
impress
he says,
six-by-tw
bit of space between them that's polished on the inside, so the light actually kicks through the whole thing. The Room is pretty boss."

The only problem was that the memorial was in the final stages of construction and not yet open, so they crept around the edges, looking for a way in. A perfect setup for a little of that Murray magic.

"I waved to the people driving in and out in their itty-bitty cars, and eventually I saw one of the guys walking back, saying, 'They

*Why did the edges of the screen flash?*

This indicates that Guided Reading is available for this article. If you like, you can tap the sides of the page as an easy way to move from section to section.

Ta/tt

Fig. 3 he, since Buster Keaton, has access. "That," he said finally, "is *acting*."

Now he tells the story of his morning on Roosevelt Island—except not about the kickball game. I will have to learn about that later, on the Internet. Instead, he talks about the original reason for the trip, where he went first: to see the recently completed FDR Four Freedoms memorial, located on the tip of the island (where, he mentions, an unfilmed scene in *Ghostbusters* was meant to be set). He had seen a documentary about the project on PBS and, having recently channeled the president, decided to take his friends for a look.

"It was designed by Lou got some moves," he says, photos on his phone and shaking his head, impressed. "This is what they call The Room," he says, passing the phone. "There's six-by-six-by-twelve-foot granite blocks with a tiny bit of space between them that's polished on the inside, so the light actually kicks through the whole thing. The Room is pretty boss."

The only problem was that the memorial was in the final stages of construction and not yet open, so they crept around the edges, looking for a way in. A perfect setup for a little of that Murray magic.

"I waved to the people driving in and out in their itty-bitty cars, and eventually I saw one of the guys walking back, saying, 'They

Fig. 4 he, since Buster Keaton, has access. "That," he said finally, "is *acting*."

Now he tells the story of his morning on Roosevelt Island—except not about the kickball game. I will have to learn about that later, on the Internet. Instead, he talks about the original reason for the trip, where he went first: to see the recently completed FDR Four Freedoms memorial, located on the tip of the island (where, he mentions, an unfilmed scene in *Ghostbusters* was meant to be set). He had seen a documentary about the project on PBS and, having recently channeled the president, decided to take his sons and their ▓▓▓▓▓▓▓▓ Louis Kahn, and it's ▓▓▓▓▓▓▓▓ays, flipping through photos on his phone and shaking his head, impressed. "This is what they call The Room," he says, passing the phone. "There's six-by-six-by-twelve-foot granite blocks with a tiny bit of space between them that's polished on the inside, so the light actually kicks through the whole thing. The Room is pretty boss."

The only problem was that the memorial was in the final stages of construction and not yet open, so they crept around the edges, looking for a way in. A perfect setup for a little of that Murray magic.

"I waved to the people driving in and out in their itty-bitty cars, and eventually I saw one of the guys walking back, saying, 'They

Fig. 6 he, since Buster Keaton, has access. "That," he said finally, "is *acting*."

Now he tells the story of his morning on Roosevelt Island—except not about the kickball game. I will have to learn about that later, on the Internet. Instead, he talks about the original reason for the trip, where he went first: to see the recently completed FDR Four Freedoms memorial, located on the tip of the island (where, he mentions, an unfilmed scene in *Ghostbusters* was meant to be set). He had [...]

*You've got it!*

Remember, flashing on the edge of the screen when you zoom in lets you know that Guided Reading is available.

bit of space between them that's polished on the inside, so the light actually kicks through the whole thing. The Room is pretty boss."

The only problem was that the memorial was in the final stages of construction and not yet open, so they crept around the edges, looking for a way in. A perfect setup for a little of that Murray magic.

"I waved to the people driving in and out in their itty-bitty cars, and eventually I saw one of the guys walking back, saying, 'They

Fig. 7 omless gear of deadpan to which perhaps only he, since Buster Keaton, has access. "That," he said finally, "is *acting*."

Now he tells the story of his morning on Roosevelt Island—except not about the kickball game. I will have to learn about that later, on the Internet. Instead, he talks about the original reason for the trip, where he went first: to see the recently completed FDR Four Freedoms memorial, located on the tip of the island (where, he mentions, an unfilmed scene in *Ghostbusters* was meant to be set). He had seen a documentary about the project on PBS and, having recently channeled the president, decided to take his sons and their friends for a look.

"It was designed by Louis Kahn, and it's got some moves," he says, flipping through photos on his phone and shaking his head, impressed. "This is what they call The Room," he says, passing the phone. "There's six-by-six-by-twelve-foot granite blocks with a tiny bit of space between them that's polished on the inside, so the light actually kicks through the whole thing. The Room is pretty boss."

The only problem was that the memorial was in the final stages of construction and not yet open, so they crept around the edges, looking for a setup for a little of ... driving in and out ... eventually I saw one of the guys walking back, saying, 'They ... id you were out here?'" Murray seems suddenly sheepish, as if hearing how it sounds:

Fig. 8

METHOD AND SYSTEM FOR A USER SELECTED ZOOM LEVEL FOR OPTIMAL CONTENT DISPLAY SCREEN RENDERING

CROSS REFERENCE TO RELATED APPLICATIONS

This application is related to co-pending commonly assigned U.S. patent application Ser. No. 14/065,011, titled "A METHOD AND SYSTEM FOR A VISUAL INDICATOR A DISPLAYED PAGE ENABLEMENT FOR GUIDED READING" by Anthony O'Donoghue, et. al, filed on Oct. 28, 2013, and which is incorporated herein in its entirety.

This application is related to co-pending commonly assigned U.S. patent application Ser. No. 14/065,294, titled "A METHOD AND SYSTEM FOR A SINGLE TAP GESTURE ADVANCEMENT TO NEXT CONTENT PORTION" by Anthony O'Donoghue, et. al, filed on Oct. 28, 2013, and which is incorporated herein in its entirety.

This application is related to co-pending commonly assigned U.S. patent application Ser. No. 14/065,086, titled "A METHOD AND SYSTEM FOR TEXTUALLY BIASED FLOW FOR SUCCESSIVELY RENDERED CONTENT PORTIONS" by Anthony O'Donoghue, et. al, filed on Oct. 28, 2013, and which is incorporated herein in its entirety.

This application is related to co-pending commonly assigned U.S. patent application Ser. No. 14/065,254, titled "A METHOD AND SYSTEM FOR AUTOMATIC INVOCATION OF GUIDED READING TUTORIAL BASED ON ACCOUNT ACTIVITY" by Anthony O'Donoghue, et. al, filed on Oct. 28, 2013, and which is incorporated herein in its entirety.

FIELD OF THE INVENTION

The present invention is generally related to handheld e-book readers.

BACKGROUND OF THE INVENTION

A touchscreen is an electronic visual display that the user can control through simple or multi-touch gestures by touching the screen with one or more fingers. Some touchscreens can also detect objects such as a stylus or ordinary or specially coated gloves. The user can use the touchscreen to react to what is displayed and to control how it is displayed (for example by zooming the text size).

The touchscreen enables the user to interact directly with what is displayed, rather than using a mouse, touchpad, or any other intermediate device (other than a stylus, which is optional for most modern touchscreens). Touchscreens are common in devices such as game consoles, all-in-one computers, tablet computers, and smartphones. They can also be attached to computers or, as terminals, to networks. They also play a prominent role in the design of digital appliances such as personal digital assistants (PDAs), satellite navigation devices, mobile phones, and video games.

Touchscreens are also often used to implement e-book readers. An e-book reader, also called an e-book device or e-reader, is a mobile electronic device that is designed primarily for the purpose of reading digital e-books and periodicals. Any device that can display text on a screen may act as an e-book reader, but specialized e-book reader designs may optimize portability, readability (especially in sunlight), and battery life for this purpose. A single e-book reader is capable of holding the digital equivalent of hundreds of printed texts with no added bulk or measurable mass.

A problem exists however with e-book readers and that the pages of periodicals and magazines can be much larger than the screen of a handheld e-book reader. This leads to very tiring reading experience, where users often must pan and scroll in order to see the pages of the document they are trying to read.

SUMMARY OF THE INVENTION

In one embodiment, the present invention is implemented as a user interface method for user selected zoom level determination. The method includes displaying a page of a document on a screen of the handheld device, and receiving an input from a user of the handheld device and setting a zoom level of the page in accordance therewith. The method further includes, in response to the zoom level, processing the page in accordance therewith to produce a plurality of dynamically sized segments, and for displaying successive pages on the screen, processing the successive pages to produce additional dynamically sized segments in accordance with the zoom level.

In one embodiment, the present invention is implemented as a non-transitory computer readable memory having computer readable code which when executed by a computer system causes the computer system to implement a user interface method for user selected zoom level determination on a handheld device. The method includes displaying a page of a document on a screen of the handheld device, and receiving an input from a user of the handheld device and setting a zoom level of the page in accordance there with. The method further includes, in response to the zoom level, processing the page in accordance there with to produce a plurality of dynamically sized segments, and for displaying successive pages on the screen, processing the successive pages to produce additional dynamically sized segments in accordance with the zoom level.

In one embodiment, the present invention is implemented as a handheld device having a system memory, a central processor unit coupled to the system memory, a graphics processor unit communicatively coupled to the central processor unit, and a touchscreen, wherein the central processor unit executes computer readable code and causes the handheld device to implement a method for user selected zoom level determination. The method includes displaying a page of a document on a screen of the handheld device, and receiving an input from a user of the handheld device and setting a zoom level of the page in accordance there with. The method further includes, in response to the zoom level, processing the page in accordance there with to produce a plurality of dynamically sized segments, and for displaying successive pages on the screen, processing the successive pages to produce additional dynamically sized segments in accordance with the zoom level.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

FIG. 2 shows a depiction of a viewing screen of a handheld device showing a guided reading confirmation region on the left side and the right side of the screen in accordance with one embodiment of the present invention.

FIG. 3 show a process for automatically invoked guided reading tutorial that is displayed on the screen of the handheld device in accordance with one embodiment of the present invention.

FIG. 4 show a process for automatically invoked guided reading tutorial that is displayed on the screen of the handheld device in accordance with one embodiment of the present invention.

FIG. 6 shows a process for automatically invoked guided reading tutorial that is displayed on the screen of the handheld device in accordance with one embodiment of the present invention.

FIG. 7 shows a process for automatically invoked guided reading tutorial that is displayed on the screen of the handheld device in accordance with one embodiment of the present invention.

FIG. 8 shows a process for automatically invoked guided reading tutorial that is displayed on the screen of the handheld device in accordance with one embodiment of the present invention.

DETAILED DESCRIPTION OF THE INVENTION

Figure 1:
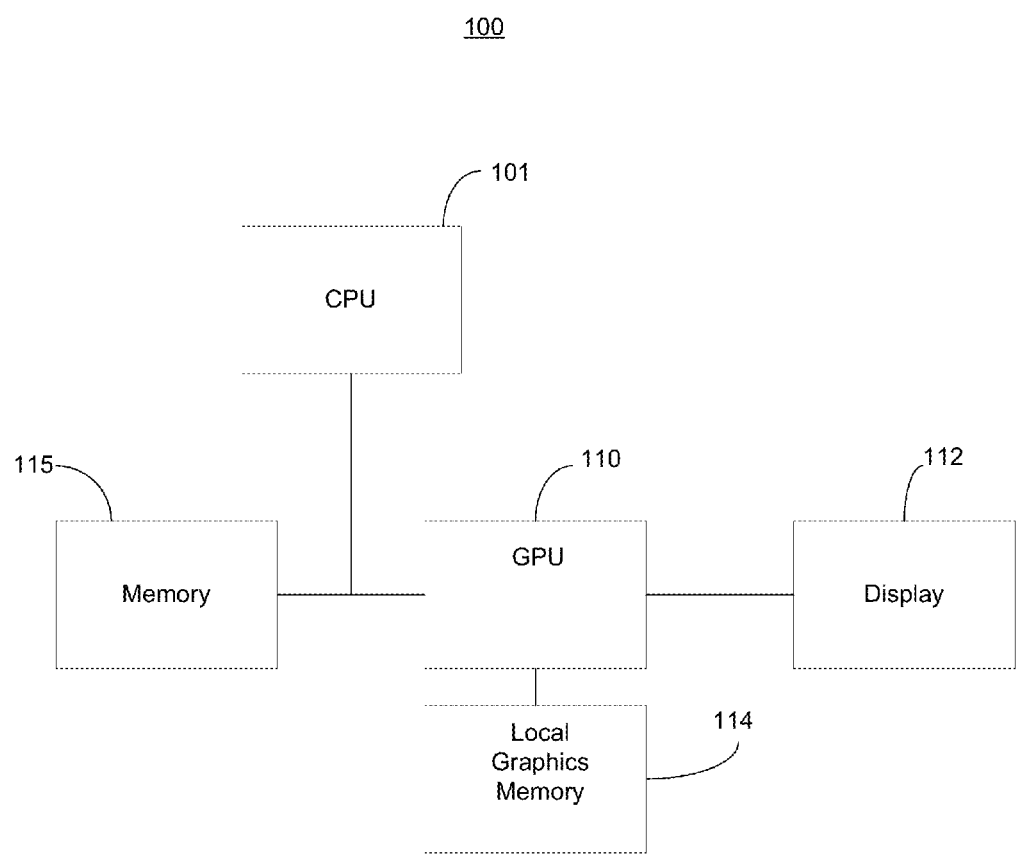
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

Embodiments of the Invention:

Embodiments of the present invention are designed to facilitate the convenient and intuitive reading of electronic documents on handheld devices. These devices are typically handheld tablets, handheld e-readers, and the like, and include computer system functionality as described above in the discussion of FIG. 1. The documents are typically magazines, comic books, periodicals, newspapers, and the like, that contain both printed content and pictorial content. Most times the layout of these documents is designed to invoke certain feelings or familiarity with the readers of these documents (e.g., a familiar print layout of a monthly magazine, a first page layout of a newspaper, and the like). Embodiments of the present invention aim to maintain this familiar layout of a document, while simultaneously making the reading of such a document more convenient on the typical small screens of the handheld devices. Embodiments of the present invention enable a user to read a document in a convenient and user intuitive manner while also allowing the user to avoid constantly pinching and zooming to different levels of magnification, panning and swiping in different directions to see different parts of the document, and annoyances of the like. One of the tools embodiments of the present invention employ is guided reading.

FIG. 2 shows a depiction of a viewing screen of a handheld device showing a guided reading confirmation region on the left side and the right side of the screen in accordance with one embodiment of the present invention. As described herein, a guide reading applies to reading magazines, comics, periodicals. As distinguished from reading an entire page of a digitally rendered book (e.g., "ebook"), when displaying an entire page of a magazine on a tablet or mobile phone reading device, the resultant font size will be typically unreadable as rendered. As described above, conventionally, reading the magazine content on the small-display screen involves navigating to a selected portion of the content, then expanding the font size using typically a PDF zoom by multipoint touch-then-separate-the-fingers on the touch-sensitive display screen. However, a user is left to navigate the entire page using some combination of panning (up, down, left, right) and possibly further zooming, all the while keeping track of their relative position with regard to the segments of the magazine page being read as reading progresses across the columns and paragraphs comprising the magazine page.

Generally, as a prerequisite to enabling the guided reading features described below, the content of the magazine article must have been a priori segmented into pre-determined discrete portions to be successively rendered on a given small-display screen. In one embodiment of the invention, an important twist on such segmentation is implemented, where such segmentation appears to be accomplished dynamically.

In one embodiment, upon displaying entire page of magazine (e.g., Cover Page, Contents Page, etc.), once the user indicates an intention to read the page, such as by the multi-point touch-then-separate-the-fingers action (or, in another embodiment, simply by single-tap on a center-region of the device display screen), a visual indicator is activated and rendered temporarily, to confirm to the user that the article is enabled for guided reading. This is shown in FIG. 2. In the FIG. 2 embodiment, the visual indicator rendered is a pair of colored left- and right-border regions along top to bottom of the display screen, as shown.

FIG. 3 through FIG. 8 show a process for automatically invoked guided reading tutorial that is displayed on the screen of the handheld device in accordance with one embodiment of the present invention.

One of the goals of embodiments of the present invention is to instruct every first-time reader of an eMagazine enabled for guided reading in order to maximize their reading experience. In one embodiment, an on-line instruction program is linked to every user account linked to an on-line store or cloud-based library. In one embodiment, once a user buys their first eMagazine or eComic enabled for guided reading, and then attempts to read (e.g., multi-point finger-separation to PDF-zoom detected), the instruction program is automatically invoked, whereupon the user-reader is automatically lead and handheld though the features of guided reading, to familiarize them.

FIG. 3 through FIG. 8 show an example of this process. For example, as described above, consider a case where the user taps on the touchscreen and the visual indicator is rendered as shown in FIG. 2. FIG. 3 shows the initiation of the reading tutorial, where the device communicates by rendering instructions as shown. FIG. 4 shows how a user is guided through the manner in which different sections are brought up for display. In the FIG. 4 illustration, the user is instructed to tap the right edge to move to the next section, and for example, as shown in FIG. 6, tap the left edge to move back.

Figure 5:
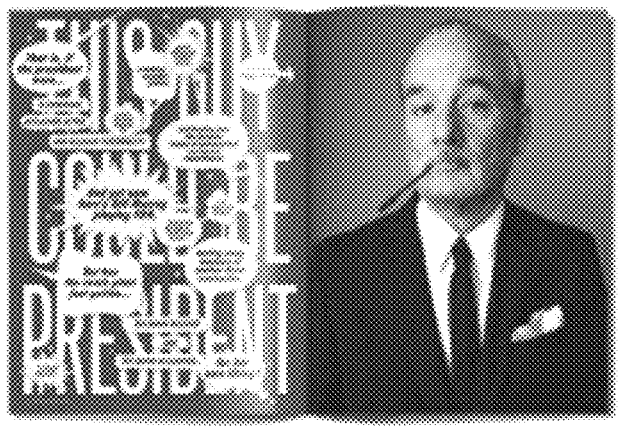
FIG. 5 show a process for automatically invoked guided reading tutorial that is displayed on the screen of the handheld device in accordance with one embodiment of the present invention.

FIG. 5 shows a user input response in accordance with one embodiment of the present invention. In order to make the handheld device feel comfortable and responsive to input, it is important that visual response indicators are provided to the user to signify that the user input was indeed received and that the device is attempting to respond. This avoids a situation where a user continues tapping swiping or otherwise attempting input because the device is not responding to said input. In FIG. 5, the response is to display a blue dot at the point of contact to visually let the user know the input was received.

As described above, embodiments of the present invention aim to maintain this familiar layout of a document, while simultaneously making the reading of such a document more convenient on the typical small screens of the handheld devices. Embodiments of the present invention enable a user to read a document in a convenient and user intuitive manner while also allowing the user to avoid constantly pinching and zooming to different levels of magnification, panning and swiping in different directions to see different parts of the document, and annoyances of the like.

Embodiments of the present invention can implement user selected zoom level determination in order to determine an optimal content segment size for rendering on the display screen of a handheld device. For example, in one embodiment, once the user completes a multipoint touch-then-expand on the touch-sensitive display screen to select a desired zoom factor/font size for reading of the PDF document, the system remembers this zoom factor/font size and uses this for subsequent reading of that article. Importantly, since guided reading is implemented via successive segments of content sized to fit the display screen, the page content is dynamically segmented into portions for display in accordance with said user-selected zoom factor/font size. In one embodiment, a dynamic segmentation is implemented on the fly by the handheld device. Alternatively, in a different embodiment, the document can be preprocessed into segments which are then displayed sequentially by the handheld device.

Embodiments of the present invention can implement functionality such that, for example, with a single tap on the display screen (e.g., in the right hand margin, in one embodiment), the reader advances to a next portion of content for reading the successive portions comprising the magazine page or magazine article. Thus the user does not have to pan (e.g., or pan and zoom combination) to advance through or across the various paragraphs and columns that comprise the magazine page. Relatedly, a single-tap gesture on a center-portion of the display screen may invoke a menu, for display on the lower portion of the screen, in an embodiment. An example of this is visually depicted in FIG. 8.

Embodiments of the present invention can also implement textually based flow for successively rendered segments. A conventional magazine typically has discontinuities in the page and/or article being read; such as for (typically numerous) advertisements; also for "CONTINUED ON PAGE XX" whereupon the reader is instructed to skip from page 30 to page 54 to continue reading that article, for instance. In contrast, in guided reading, the flow to successive segmented portions of the content is text-biased to render the article integrally, without discontinuities, or any need for a user to skip pages.

In one embodiment, spatially intervening advertisements may be displayed temporally before advancement to the next text portion of content in the reading progression. This keeps the ad in a user's awareness. The user is able to review the ad in its entirety simply by "back-swiping" across the currently-rendered portion of text-content, before advancing to the next portion of text content using the single-tap gesture. Once the last segmented portion of content is read, the advancement gesture, in one embodiment, a single-tap in right-hand margin of display screen, results in a zoom out to display that entire magazine last page, and not a next page of the magazine.

In one embodiment, once a user "back-swipes" to pause and consider an advertisement that had just been transitioned over, the act of the back-swipe also serves as trigger for calling forth a pre-recorded sound related to the ad. In this manner, advertisers could increase the "richness" of the ads presented, beyond just visual/textual, to make them more appealing & catchy, thereby enhancing a user's enjoyment and retention of the ad's subject matter. In a related embodiment, users could also set preferences whether the sound is activated. In one embodiment, the ad itself can be an animation or other type of video with or without any corresponding audio.

FIG. 9 through FIG. 13 show a plurality of flow charts depicting the guided reading functionality of embodiments of the present invention as described above.

Figure 9:
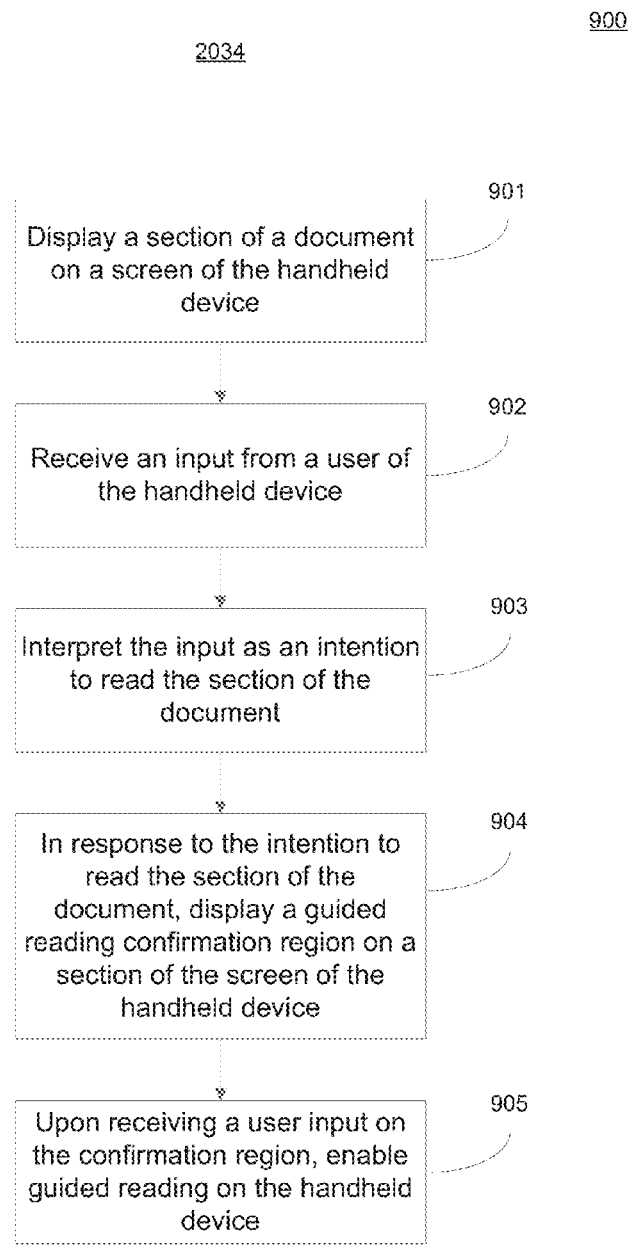
FIG. 9 shows a flowchart of the steps of a process for presenting a visual indicator on a display page to signal to a user the page is enabled for guided reading in accordance with one embodiment of the present invention.

FIG. 9 shows a flowchart of the steps of a process 900 for presenting a visual indicator on a display page to signal to a user the page is enabled for guided reading in accordance with one embodiment of the present invention. Process 900 begins in step 901, where the process displays a section of a document on a screen of the handheld device. In step 902, the process receives an input from a user of the handheld device. In step 903, the process interprets the input as an intention to read the section of the document. In step 904, in response to the intention to read the section of the document, the process displays a guided reading confirmation region on a section of the screen of the handheld device. Subsequently, in step 905, upon receiving a user input on the confirmation region, the process enables guided reading on the handheld device.

In one embodiment, the screen of the handheld device is a touchscreen. Alternatively, there can be embodiments where a user input is received in different ways other than touch on a touchscreen (e.g., buttons along a bezel of the device, or the like).

As described above, in one embodiment, the guided reading confirmation region comprises two regions, one on each side of the screen of the handheld device. In one embodiment, the two regions comprise blue bars, one on each side of the screen of the handheld device, as was described above in the discussion of FIG. 2.

In one embodiment, the input as the intention to read the section of the document comprises receiving a single tap on the on the screen of the handheld device.

In one embodiment, the input as the intention to read the section of the document comprises a multipoint touch then separate tap on the screen of the handheld device. This can be done such as, for example, using a multi-finger touch onto the touchscreen.

In one embodiment, the guided reading confirmation region is rendered temporarily as confirmation that a page of the document is enabled for guided reading. This can be done such as, for example, temporarily rendering the two blue bars on either side of the screen as shown in FIG. 2.

Figure 10:
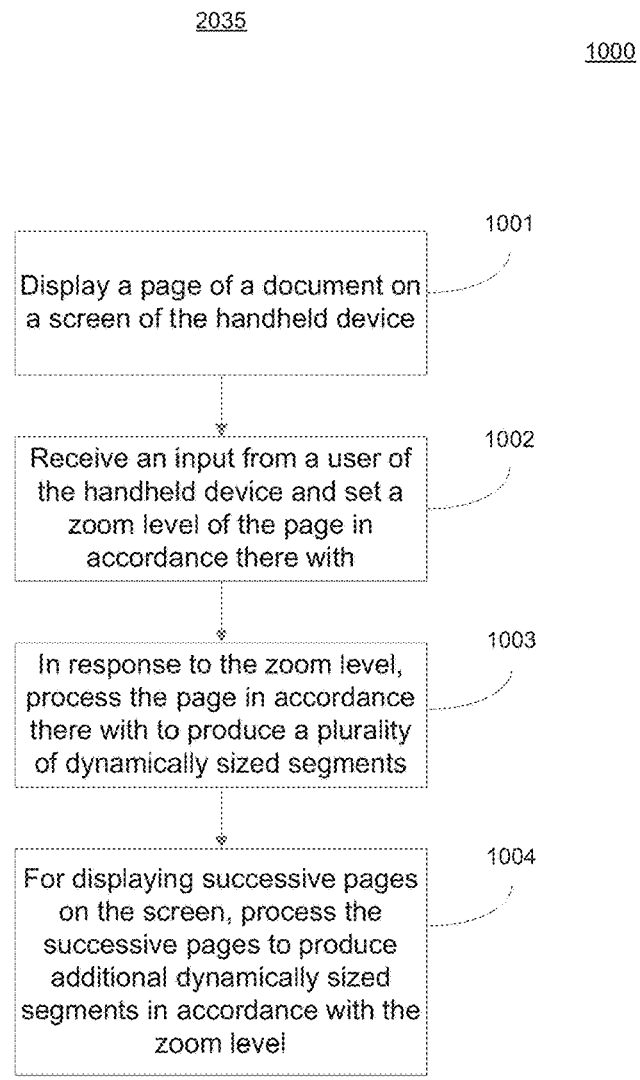
FIG. 10 shows a flowchart of the steps of a process implementing user selected zoom level determination in accordance with one embodiment of the present invention.

FIG. 10 shows a flowchart of the steps of a process 1000 implementing user selected zoom level determination in accordance with one embodiment of the present invention. Process 1000 begins in step 1001, where the process displays a page of a document on a screen of the handheld device. In step 1002, the process receives an input from a user of the handheld device and setting a zoom level of the page in accordance there with. In step 1003, in response to the zoom level, the method processes the page in accordance there with to produce a plurality of dynamically sized segments. In step 1004, for displaying successive pages on the screen, the method processes the successive pages to produce additional dynamically sized segments in accordance with the zoom level.

As described above, in one embodiment, the screen of the handheld device is a touchscreen. Alternatively, there can be embodiments where a user input is received in different ways other than touch on a touchscreen (e.g., buttons along a bezel of the device, or the like). Additionally, as described above, in one embodiment, the document comprises a magazine.

As described above, the input comprises a multipoint touch then separate tap on the screen of the handheld device. In one embodiment, the multipoint touch then separate tap comprises a pinch and zoom (e.g., using multiple fingers).

In one embodiment, the processing of the page in response to the zoom level further comprises adjusting the font size of the page in response to the same level. This allows an even more flexible level of user control.

In one embodiment, the dynamically sized segments have size proportions that are stored and used for successive pages of the document. This allows the handheld device to remember the user selected zoom level and process a document in accordance there with.

In one embodiment, the document comprises a plurality of articles and wherein the dynamically sized segments are used in each of the plurality of articles. This avoids having the user repeatedly set zoom preferences.

Figure 11:
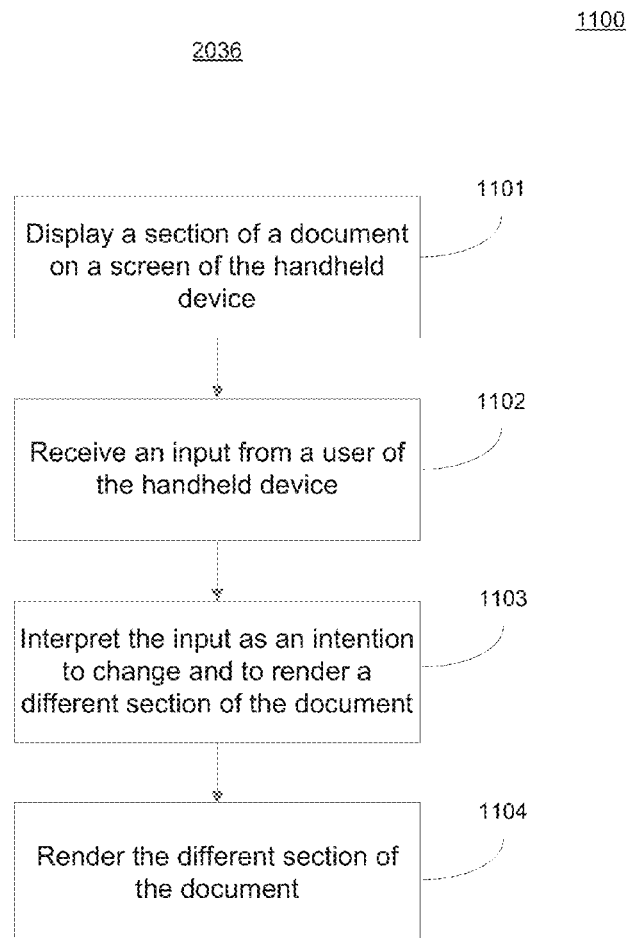
FIG. 11 shows a flowchart of the steps of a process for implementing a single tap gesture for advancement to a next content portion in accordance with one embodiment of the present invention.

FIG. 11 shows a flowchart of the steps of a process 1100 for implementing a single tap gesture for advancement to a next content portion in accordance with one embodiment of the present invention. The process begins with step 1101, where the process displays a section of a document on a screen of the handheld device. In step 1102, the process receives an input from a user of the handheld device. In step 1103, the process interprets the input as an intention to change and to render a different section of the document. In step 1104, the process renders the different section of the document.

In one embodiment, the document comprises a magazine and the section comprises part of a page of the magazine. Hence, a magazine can include a large number of sections.

In one embodiment, the intention to change causes the rendering of a subsequent section of the document. Hence the user can continue through the magazine article despite successively tapping when they have finished reading the displayed section.

In one embodiment, the intention to change causes the rendering of an earlier section of the document (e.g., tapping on the left side to go back to a previously rendered section). In one embodiment, the intention to change causes the rendering of an later section of the document (e.g., tapping on the right side to go forward to a subsequent rendered section). In one embodiment, the input from the user comprises a single tap on the screen of the handheld device.

In one embodiment, the input from the user comprises a single tap on a center portion of the screen and invokes the display of a menu on the screen as described above.

Figure 12:
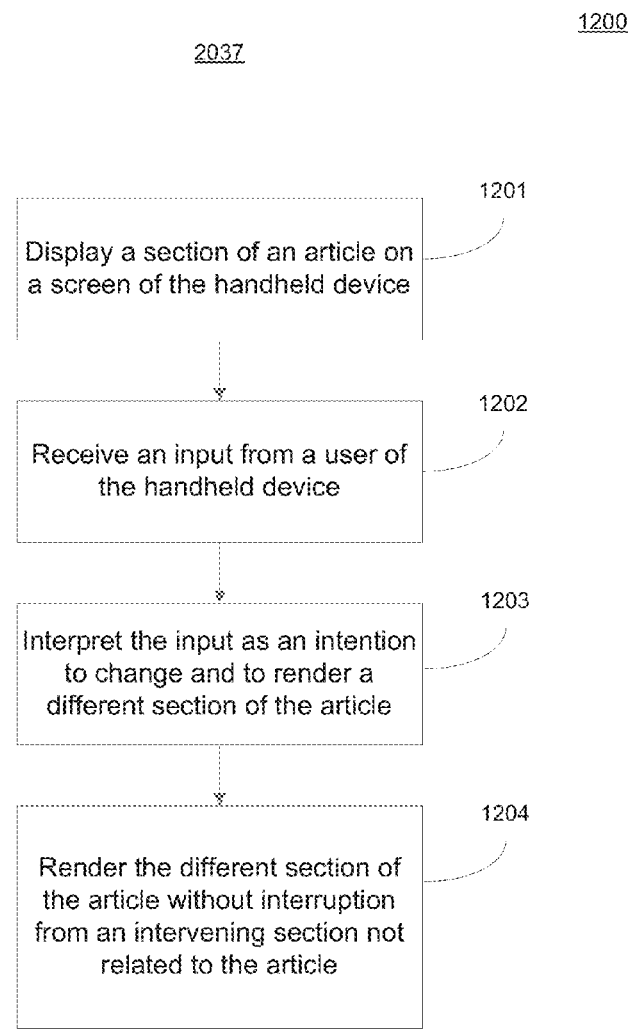
FIG. 12 shows a flowchart of the steps of a process for implementing a texturally biased flow for successively rendered segmented content portions in accordance with one embodiment of the present invention.

FIG. 12 shows a flowchart of the steps of a process 1200 for implementing a texturally biased flow for successively rendered segmented content portions in accordance with one embodiment of the present invention.

The process begins with step 1201, where the process displays a section of an article of a document on a screen of the handheld device. In step 1202, the process receives an input from a user of the handheld device. In step 1203, the process interprets the input as an intention to change and to render a different section of the article. And in step 1204, the process renders the different section of the article without interruption from an intervening section not related to the article.

In one embodiment, the document comprises a magazine and the section comprises part of a page of the magazine. In one embodiment, the intervening section not related to the article comprises an advertisement.

In one embodiment, the intervening section not related to the article comprises a plurality of pages of the document. In one embodiment, the intervening section not related to the article comprises an advertisement, and wherein the advertisement is displayed temporarily to maintain a user awareness. In one embodiment, the advertisement can be returned to the display upon a back swipe input of the user.

Figure 13:
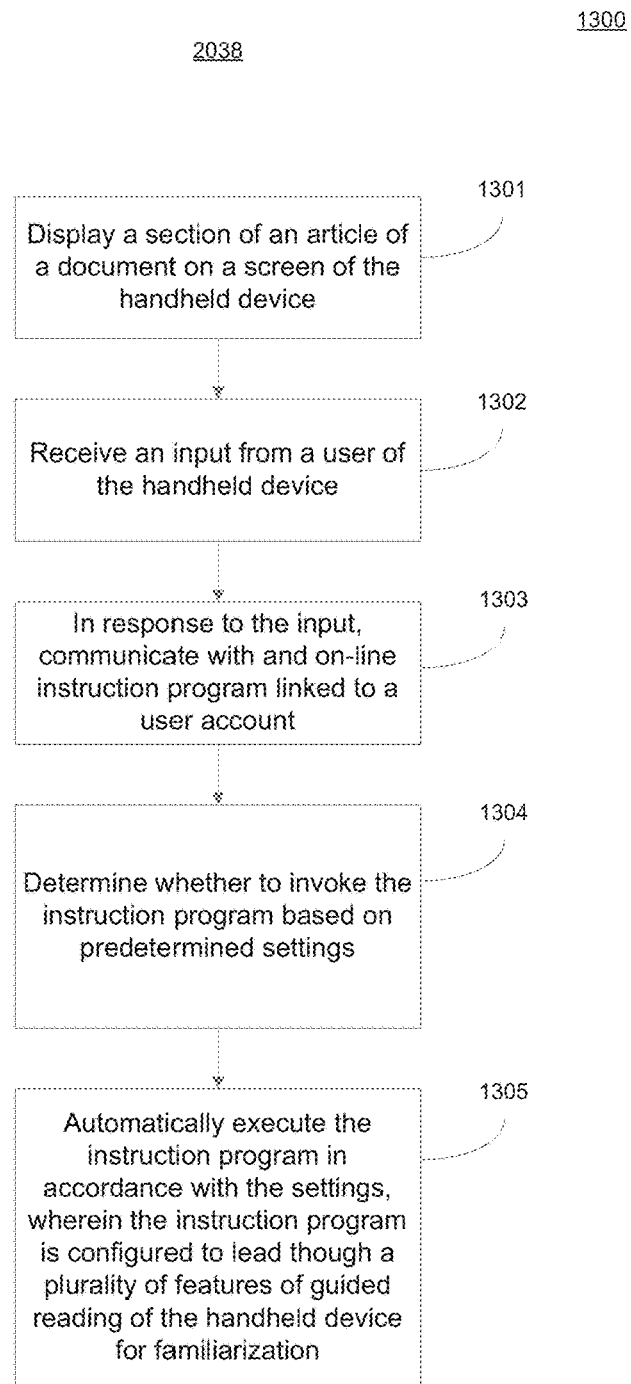
FIG. 13 shows a flowchart of the steps of a process for implementing automatic indication of a guided reading tutorial based on account activity in accordance with one embodiment of the present invention.

FIG. 13 shows a flowchart of the steps of a process 1300 for implementing automatic indication of a guided reading tutorial based on account activity in accordance with one embodiment of the present invention. Process 1300 begins in step 1301, where the process displays a section of an article of a document on a screen of the handheld device. In step 1302, the process receives an input from a user of the handheld device. In step 1303, in response to the input, the process communicates with an on-line instruction program linked to a user account. In step 1304, the process determines whether to invoke the instruction program based on predetermined settings. In step 1305, the process automatically executes the instruction program in accordance with the settings, wherein the instruction program is configured to lead though a plurality of features of guided reading of the handheld device for familiarization.

In one embodiment, one of the predetermined settings involves detecting whether the user is a first use of guided reading. This would allow the tutorial program to automatically be invoked upon, for example, the first use of a device. In one embodiment, one of the predetermined settings involves detecting whether the user has purchased a first document for the handheld device. In one embodiment, the instruction program is automatically executed upon reception of a multipoint finger separation user input. In one embodiment, the instruction program is a first time reader instruction program configured to familiarize a user with features of guided reading.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for user selected zoom level determination, comprising:

displaying a page of a document on a screen of a handheld device, wherein the page includes content;

receiving a first input from a user of the handheld device and setting a zoom level of the page in accordance with the first input from the user;

in response to setting the zoom level, processing the page in accordance with the zoom level to segment the content of the page into a plurality of individually renderable content portions, which represent a plurality of dynamically sized content segments;

rendering a visual indicator on the screen of the handheld device, wherein the visual indicator confirms to the user that the content is enabled for guided reading, wherein the visual indicator at least partially overlaps one or more guided reading confirmation regions, wherein the visual indicator includes a first visual indicator that is rendered on the screen across an entirety of a left border of the screen of the handheld device, and a second visual indicator that is rendered on the screen across an entirety of a right border of the screen of the handheld device, wherein the first visual indicator overlaps a first portion of the content including one of text and images on the screen, and the second visual indicator overlaps a second portion of the content including one of text and images on the screen, and wherein an area of the screen between the first visual indicator and the second indicator does not include the visual indicator;

receiving a second input at the one or more guided reading confirmation regions of the screen from the user of the handheld device and enabling guided reading of the content in accordance with the second input from the user; and for displaying successive pages on the screen, processing the successive pages in accordance with the zoom level to segment respective content of the successive pages into a respective plurality of individually renderable content portions, which represent additional dynamically sized content segments enabled for the guided reading.

2. The method of claim 1, wherein the screen of the handheld device is a touchscreen.

3. The method of claim 1, wherein the document comprises a magazine.

4. The method of claim 1, wherein the input comprises a multipoint touch then separate tap on the screen of the handheld device.

5. The method of claim 4, wherein the multipoint touch then separate tap comprises a pinch and zoom.

6. The method of claim 1, wherein the processing of the page in response to the setting the zoom level further comprises adjusting the font size of the page to the same zoom level.

7. The method of claim 1, wherein the dynamically sized content segments have size proportions that are stored and used for successive pages of the document.

8. The method of claim 1, wherein the document comprises a plurality of articles and wherein the dynamically sized content segments are used in each of the plurality of articles.

9. A non-transitory computer readable memory having computer readable code which when executed by a computer system causes the computer system to implement a method for user selected zoom level determination on a handheld device, comprising:

displaying a page of a document on a screen of the handheld device, receiving a first input from a user of the handheld device and setting a zoom level of the page in accordance with the first input from the user;

in response to setting the zoom level, processing the page in accordance with the zoom level to segment the content of the page into a plurality of individually renderable content portions, which represent a plurality of dynamically size content segments;

rendering a visual indicator on the screen of the handheld device, wherein the visual indicator confirms to the user that the content is enabled for guided reading, wherein the visual indicator at least partially overlaps one or more guided reading confirmation regions, wherein the visual indicator includes a first visual indicator that is rendered on the screen across an entirety of a left border of the screen of the handheld device, and a second visual indicator that is rendered on the screen across an entirety of a right border of the screen of the handheld device, wherein the first visual indicator overlaps a first portion of the content including one of text and images on the screen, and the second visual indicator overlaps a second portion of the content including one of text and images on the screen, and wherein an area of the screen between the first visual indicator and the second indicator does not include the visual indicator;

receiving a second input at the one or more guided reading confirmation regions of the screen from the user of the handheld device and enabling guided reading of the content in accordance with the second input from the user; and for displaying successive pages on the screen, processing the successive pages in accordance with the zoom level to segment respective content of the successive pages into a respective plurality of individually renderable content portions, which represent additional dynamically sized content segments enabled for the guided reading.

10. The computer readable memory of claim 9, wherein the screen of the handheld device is a touchscreen.

11. The computer readable memory of claim 9, wherein the document comprises a magazine.

12. The computer readable memory of claim 9, wherein the input comprises a multipoint touch then separate tap on the screen of the handheld device.

13. The computer readable memory of claim 12, wherein the multipoint touch then separate tap comprises a pinch and zoom.

14. The computer readable memory of claim 9, wherein the processing of the page in response to the setting the zoom level further comprises adjusting the font size of the page to the same zoom level.

15. The computer readable memory of claim 9, wherein the dynamically sized content segments have size proportions that are stored and used for successive pages of the document.

16. The computer readable memory of claim 9, wherein the document comprises a plurality of articles and wherein the dynamically sized content segments are used in each of the plurality of articles.

17. A handheld device, comprising:
a system memory;
a central processor unit coupled to the system memory;
a graphics processor unit communicatively coupled to the central processor unit; and
a screen,
wherein the central processor unit executes computer readable code and causes the handheld device to implement a method of user selected zoom level determination, comprising:

displaying a page of a document on the screen of the handheld device, wherein the page includes content;

receiving a first input from a user of the handheld device and setting a zoom level of the page in accordance with the first input from the user;

in response to setting the zoom level, processing the page in accordance with the zoom level to segment the content of the page into a plurality of individually renderable content portions, which represent a plurality of dynamically sized content segments;

rendering a visual indicator on the screen of the handheld device, wherein the visual indicator confirms to the user that the content is enabled for guided reading, wherein the visual indicator at least partially overlaps one or more guided reading confirmation regions, wherein the visual indicator includes a first visual indicator that is rendered on the screen across an entirety of a left border of the screen of the handheld device, and a second visual indicator that is rendered on the screen across an entirety of a right border of the screen of the handheld device, wherein the first visual indicator overlaps a first portion of the content including one of text and images on the screen, and the second visual indicator overlaps a second portion of the content including one of text and images on the screen, and wherein an area of the screen between the first visual indicator and the second indicator does not include the visual indicator;

receiving a second input at the one or more guided reading confirmation regions of the screen from the user of the handheld device and enabling guided reading of the content in accordance with the second input from the user; and for displaying successive pages on the screen, processing the successive pages in accordance with the zoom level to segment respective content of the successive pages into a respective plurality of individually renderable content portions, which represent additional dynamically sized content segments enabled for guided reading.

18. The handheld device of claim 17, wherein the screen of the handheld device is a touchscreen.

19. The handheld device of claim 17, wherein the document comprises a magazine.

20. The handheld device of claim 17, wherein the document comprises a plurality of articles and wherein the dynamically sized content segments are used in each of the plurality of articles.

21. The method of claim 1, further comprising:
rendering a visual indicator on the screen of the handheld device, wherein the visual indicator confirms to the user that the content is enabled for guided reading.

22. The method of claim 1, wherein a guided reading tutorial is automatically invoked upon first use of the guided reading at the handheld device.

23. The method of claim 1, wherein the first visual indicator is rendered on the screen across the entirety of the left border of the screen of the handheld device, and the second visual indicator is rendered on the screen across the entirety of the right border of the screen of the handheld device.

* * * * *